United States Patent Office 3,437,717
Patented Apr. 8, 1969

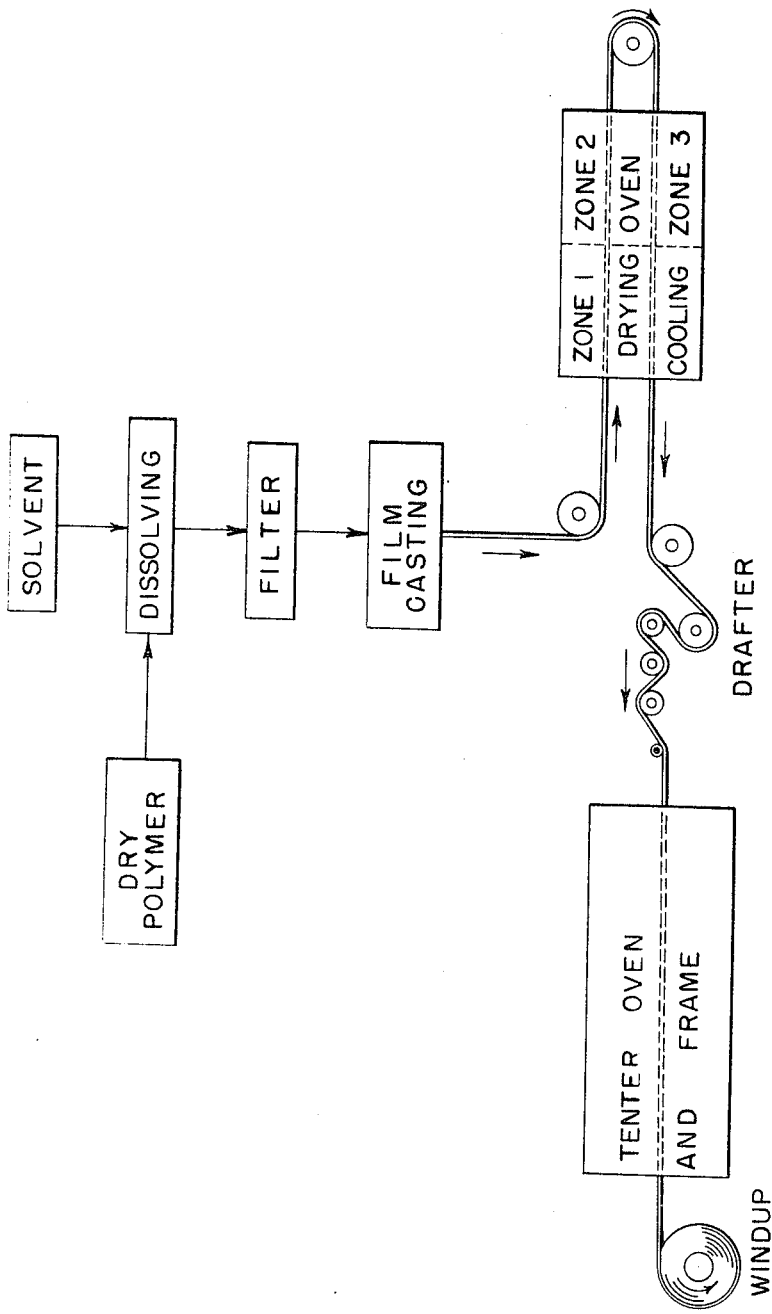

3,437,717
PROCESS FOR PRODUCING BIAXIALLY STRETCHED FILMS FROM A NITRILE POLYMER SOLUTION AND PRODUCT
Ralph E. Isley, Northfield, Richard C. Adams, Chardon, and Lawrence E. Ball, Akron, Ohio, assignors to The Standard Oil Company, Cleveland, Ohio, a corporation of Ohio
Filed June 22, 1964, Ser. No. 377,041
Int. Cl. C08f 47/14, 15/34; B29d 7/24
U.S. Cl. 260—881       7 Claims

ABSTRACT OF THE DISCLOSURE

Biaxially oriented films of interpolymers of an alpha, beta-monoolefinically unsaturated nitrile such as acrylonitrile and a polyalkenyl monomer such as butanediol-1,4-divinyl ether are prepared by stretching in longitudinal and transverse directions a solvent-containing film of said interpolymer and then heat setting and drying the film.

---

This invention relates to oriented films and other shaped articles of polymers of alpha, beta-olefinically unsaturated monomers and more particularly pertains to biaxially oriented films of certain nitrile polymers and to a process for preparing said biaxially oriented films.

The film-forming alpha, beta-olefinically unsaturated nitrile polymers most useful in the present invention are those composed of an alpha, beta-olefinically unsaturated nitrile monomer component and a polyalkenyl monomer component and includes those more fully described and claimed in the copending U.S. patent application of R. E. Isley and R. C. Adams, Ser. No. 265, 081, filed Mar. 14, 1963.

Polyacrylonitrile has been variously reported as fibrillating severely during uniaxial orientation and being essentially impossible to orient biaxially as has been pointed out in Birtish Patent No. 887,008. This British patent describes a method for preparing an oriented film of polyacrylonitrile by starting with a "coalesced film." See also Britist Patent No. 863,425.

We have discovered that useful films having outstanding physical properties and chemical resistance can be prepared by the process which comprises casting a film from a solution of a polymer composed of an alpha, beta-olefinically unsaturated nitrile monomer component and a polyalkenyl monomer component, removing some or virtually all of the solvent from said film, stretching the at least partially dried film in a longitudinal direction, stretching the film then in a transverse direction (substantially at right angles to the longitudinal stretched direction) and at the same time removing at least some of the solvent, heat setting (i.e., maintaining the film in a biaxially stretched condition while heating) the film and removing substantially all of the solvent therefrom. Our process is to be distinguished from the so-called "coalesced film" process of the prior art in that we use solutions of polymer rather than dispersions of polymer for film casting and our process does not involve a washing or leaching step because there are substantially no extraneous non-volatile materials present in our casting solutions. The cast films from our casting solutions do not contain large pores or voids as do the previously described "coalesced" films. The vapor and gas barrier properties of our cast film are excellent even in the unoriented state and there is very little difference in the density of our biaxially oriented films and those which are unoriented which further distinguishes our films from those prepared by the "coalesced film" process.

It is an object of the present invention, therefore, to provide novel biaxially oriented films which have excellent physical properties and are excellent barriers for most vapors and gases. It is also an object to provide a method for production of these novel biaxially oriented films.

That the foregoing and other objects have been accomplished will become apparent to those skilled in the art from the following description and illustrative examples.

The copolymers most useful in the process of the present invention are those resulting from the copolymerization of (1) at least one alpha, beta-monoolefinically unsaturated nitrile monomer having from 3 to 4 carbon atoms and a terminal $CH_2=C<$ group and (2) at least one polyalkenyl monomer copolymerizable with (1).

It is preferred that the polymers embodied herein be the polymerization product of about 100 parts by weight of the alpha, beta-monoolefinically unsaturated nitrile monomer component and from 5 to 0.05 parts by weight of the polyalkenyl monomer components. It is also contemplated to be within the scope of the present invention to replace up to from 5 to 15% by weight of the alpha, beta-monoolefinically unsaturated nitrile with one or more polymerizable monoalkenyl monomers copolymerizable therewith such as those known in the art for imparting dyeability to acrylonitrile fiber polymers. Useful comonomers include those disclosed in U.S. Patents Nos. 3,073,669, 3,003,993, 2,696,478 and 2,436,926 and British Patent No. 863,425. More preferred are the copolymers of about 100 parts by weight of the alpha, beta-monoolefinically unsaturated nitrile component and from 3 to 0.1 parts of the polyalkenyl monomer component.

The alpha, beta-monoolefinically unsaturated nitrile monomers useful herein include acrylonitrile, methacrylonitrile, alpha-chloroacrylonitrile, crotononitrile, vinylidine cyanide and the like. The preferred nitrile monomers are acrylontrile and methacrylonitrile and most preferred in the present invention is acrylonitrile.

The polyalkenyl monomers embodied herein must contain at least two polymerizable alkenyl groups and preferably at least two $CH_2=C<$ groups per molecule separated by at least one other group. Such materials include allyl acrylate, allyl methacrylate, diallyl maleate, diallyl fumarate, ethylene glycol dimaleate, diallyl itaconate, methallyl acrylate, divinyl ether, diallyl ether, dimethallyl ether, ethylene glycol dimethacrylate, 1,1,1-trimethoxypropanedimethacrylate, glyceryl triacrylate, sucrose hexaacrylate, diallyl phthalate, triallyl cyanurate, 2,2,5,5-tetramethyl-1,5-hexadiene, 1,5-hexadiene, 1,6-heptadiene, 1,7-octadiene, 1,8-nonadiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraallyl silane, tetravinyl silane, diallyl vinyl silane, tetraallyl germane, tetravinyl tin, tetravinyl germane, triacryloyl perhydrotriazine, trimethacryloyl perhydrotriazine, divinyl spirobi, methylene-bis-acrylamide, ethylene diacrylamide, N-allyl acrylamide, N,N-diallyl acrylamide, N,N-dimethallyl methacrylamide, polyallyl ethers of polyhydric alcohols, such as tetraallyl pentaerythritol, hexa-allyl sucrose, hexa-allyl inositol, hexa-allyl sorbitol, hexavinyl sucrose, and the like and other types more fully disclosed in U.S. Patents Nos. 3,050,496, 2,991,276, 2,978,421, 2,716,418, 2,783,212, 2,712,004, 2,550,652, 2,475,846, 2,437,508, 2,341,334 and 2,273,891 and Canadian Patent No. 651,654.

The film-forming polymers useful herein may be prepared in any conventional manner, such as by bath, bulk, solution, or suspension polymerization techniques, all of which are well known in the art. For best results, however, it is preferred that the copolymers be prepared in an aqueous medium in the presence of a so-called redox catalyst composed of a water soluble peroxygen compound and an oxidizable sulphur compound as promotor, as more fully disclosed, for instance, in U.S. Patent No. 2,486,241. It is most preferred for best film properties that the copolymers of the present invention be prepared in two steps, the first step sometimes referred to herein as the "seed step" comprising the copolymerization of a portion of the alpha, beta-olefinically unsaturated nitrile and all of the polyalkenyl monomer to high conversion and the second step comprising polymerizing the remainder of the nitrile monomer onto or in the presence of the polymer "seed" thus formed in the first step. The second or "main polymerization step" may be carried out by adding all of the nitrile monomer to the seed polymer at once or in increments or in a continuous manner. A suitable emulsifier, surface-active agent, or dispersing agent may be used throughout both the seed step and the main polymerization step of the polymerization procedure in the preparation of the film-forming copolymers of this invention.

In a representative polymerization procedure, which is not meant to limit the scope of this invention, an aqueous medium containing about 0.1 to 2% of a perdisulfate salt, about 0.05 to 0.5% of a polymerization adjuvant, such as sodium bisulfite, and about 1 to 5% of a suitable emulsifier or dispersing agent is placed in an appropriate vessel which is provided with a means of agitation, such as stirring or shaking. This is followed by the addition of the seed step monomer mixture comprising all of the polyalkenyl monomer and part of the nitrile monomer. The air in the free space of the vessel is displaced by an inert gas such as nitrogen. The mixture is, thereafter, heated at a constant temperature in the range of from 30 to 100° C. with continuous or intermittent agitation until polymerization has proceeded to the desired extent, i.e., until substantially all of the monomer is converted to polymer. Next the remainder of the nitrile monomer is added gradually and the polymerization is carried out to high conversion (70–100%). All of the polyalkenyl monomer is always added to the seed step monomer mixture and only part of the nitrile monomer component is added in the seed step; preferably no more than half the nitrile monomer component and more preferably no more than 30% by weight of the total nitrile monomer component is used in the seed step.

At the conclusion of the polymerization, the polymers useful in this invention may be isolated as finely divided powders by a variety of methods. For example, the dispersion may be sprayed into a heated and/or evacuated chamber whereby the water is removed as vapor and the polymer falls to the bottom of the chamber. When the polymer is prepared in sufficiently high solids, i.e., 15% or higher, it often can be isolated as a fine granular powder simply by filtration or centrifugation. The polymer may also be isolated by cooling the dispersion below the freezing point of the aqueous medium or by the addition of a large volume of a lower aliphatic alcohol such as methanol or ethanol. A satisfactory procedure consists in adding an appropriate amount of an electrolyte solution to the diluted aqueous dispersion with rapid agitation at a temperature just below the point at which the precipitated particles tend to adhere. This procedure yields a polymer in the form of dense, granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the copolymer, it is filtered and washed repeatedly with water to remove traces of electrolyte and dispersing agent which may adhere to the particles. Washing with dilute solutions of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol, such as methanol or ethanol.

Because polyacrylonitrile has a very high softening temperature coupled with a serious thermal degradation problem, preparation of film therefrom would appear to be possible only through some form of solvent or dispersion casting. Copolymer solutions suitable for casting of films or the wet or dry spinning of fibers may be prepared by dissolving from about 10 to 30% by weight of the copolymer in one or a combination of volatile polar organic solvents, such as dimethyl formamide, dimethyl thioformamide, N-methyl-beta-cyano-ethyl formamide, alpha-cyano acetamide, N-methyl pyrrolidone, gamma-butyrolactone, ethylene carbonate, tetramethyl oxamide, epsilon-cyanolactam, 1,3,3,5-tetracyanopentane, dimethyl cyanamide, dimethyl methoxy acetamide, N-formyl morpholine, N-formyl hexamethylene imine, dimethyl sulfoxide, propiolactone, N,N-dimethyl acetamide, dimethyl sulfone, tetramethylene cyclic sulfone, ethylene cyanhydrin, nitromethane, acetonitrile, malonitrile, tris-dimethylaminophosphine oxide, N,N'-tetramethylmethanephosphonamide, etc., to form a high solids, pourable solution.

Examples of less preferred aqueous solvent systems for the copolymers of this invention are concentrated aqueous solutions of water-soluble inorganic salts, more particularly such salts which yield highly hydrated ions in aqueous solution, e.g., the chlorides, bromides, iodides, thiocyanates, perchlorates, and nitrates, which salts are disclosed in U.S. Patent No. 2,140,921. More specific examples of water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono- (lower alkyl) substituted guanidine thiocyanates, and the symmetrical and unsymmetrical di-(lower alkyl) substituted guanidine thiocyanates.

Well known or special techniques for dissolution of the copolymer in a solvent or mixture of solvents, such as those disclosed in U.S. Patents Nos. 2,404,713 and 2,404,728 may be employed.

If desirable, lubricants, dyes, bleaching agents, plasticizers or pseudo-plasticizers and anti-static agents may be incorporated into the polymer solution embodied herein or the final films or fibers prepared therefrom may be after-treated with same.

Stabilizers which may be included in the films or fibers of the copolymers embodied herein include the phosphorous-containing polyphenolic compounds more fully disclosed in U.S. Patent No. 2,931,696; the polyphenolic alkane compounds more fully disclosed in U.S. Patent No. 2,931,697; hydrofluoboric acid and water-soluble salts thereof as more fully disclosed in U.S. Patent No. 2,846,423; ethylene diamine tetraacetic acid and similar compounds as more fully disclosed in U.S. Patent No. 3,003,993; manganese salts as more fully disclosed in U.S. Patent No. 2,661,346; certain amine salts as more fully disclosed in U.S. Patent No. 2,835,647; and the adjuvants more fully disclosed in U.S. Patent No. 2,748,097.

It has been found that linear polyacrylonitrile of moderate molecular weight forms solution cast films which embrittle rapidly on aging. In order to obtain good aging properties in acrylonitrile homopolymer films, molecular weights of on the order of 500,000 to 1,000,000 are necessary, and at these levels, processing into films by solvent casting is uneconomic because even 5% solids solutions of such homopolymers are barely pourable under processing conditions. Very high molecular weight linear polynitrile materials must be cast from as low as 2½ to 5% by weight solids solutions. This requires removal of large amounts of solvent which would greatly reduce the rate of production of film on commercial equipment. It has been found, for instance, that when a linear homopolymer of acylonitrile having a molecular weight of 228,000 was cast into a film and aged at 60° C. for 18 hours the resulting film was too brittle to test. This was not a residual solvent effect. In contrast, a "seeded" polymer of the type embodied herein of 99.5 acryonitrile-0.5 tetramethylene diacrylate composition, for instance, prepared having an apparent molecular weight of 100,000 was found to yield a solvent cast film with excellent physical and aging properties.

Films can be cast from solutions of the copolymers embodied herein by sheet-casting techniques which involve depositing a uniform film of the solution on a smooth, flat surface and removing the solvent from the film by volatilization. The surface may be any smooth surface which does not readily adhere to the film, such as glass, metals, polymers or coated paper. Metal foils such as stainless steel or aluminum are preferred as the casting surface. Films resulting from this procedure wherein copolymers of the present invention are employed are flexible and of excellent physical properties and may be oriented by stretching in one or two mutually perpendicular directions.

In the preparation of films from solutions of the copolymer of the present invention a high production commerical solvent-casting machine resembling a Fourdrinier paper machine in general layout may be used. The copolymer solution can be distributed onto a moving, endless, flexible, polished stainless steel belt which is heated. The solvent is evaporated and a sheet still containing solvent is run from the belt around heated drums to complete the drying. The use of a heated dope of higher polymer concentrations in casting will speed up the casting process and produce a thicker film. In the laboratory a large variable temperature electric hot plate and polished stainless steel plate may be used. The polymer solution is evenly distributed with a spreader and partially dried on the hot plate at a selected temperature. Drying may then be completed in an oven.

In the present process the cast film is stretched at a selected temperature, usually in a gaseous atmosphere such as air or nitrogen, in two mutually perpendicular directions simultaneously or sequentially to form an oriented film containing volatile material. Heat setting of the film accompanied by removal of the volatile material is then carried out while holding the film under tension to restrict dimensional change in the plane of the film and thereafter cooling the film and releasing the tension thereon.

In the preferred process of the present invention the cast film, still containing from 8 to 60% by weight of solvent, and preferably from 25 to 45% by weight of solvent, is passed continuously to a drafter or similar device for longitudinal stretching. The drafter may be a conventional four-wall apparatus having two hot rolls and two cold rolls. For instance, the film may conveniently be drawn in the machine direction by passing it between or around a pair or series of slow rolls, which may be heated to the desired drawing temperature, and then between or around a pair or series of fast rolls, the two pairs or series of rolls being closely spaced so that the film is supported upon the rolls over most of the region in which it is subjected to tension, and transverse shrinking is reduced to a minimum. A useful alternative method of heating the film is by means of radiant heat applied to as small a length of film, in the desired drawing region, as is consistent with the need to heat the film to the desired drawing temperature. In the drafting operation it is desirable to employ temperatures of from about 100 to 260° F. and preferably from about 145 to 180° F. on the hot rolls and the cold rolls preferably are maintained at or near room temperature. The stretch ratio employed in the drafting operation should be from 1.2:1 to 10:1 stretched length-to-original length and preferably from about 2:1 to 4:1. The stretch rate usually is above 1,000%/min. and no greater than about 200,000%/min. in the drafter. Some of the solvent is usually removed in the drafting operation. The film, still containing most of the solvent it contained on entering the drafter, next is fed continuously into a tenter or similar apparatus where transverse stretching is carried out. One type of apparatus for drawing the film in the transverse direction comprises a tenter frame or a pair of revolving, angularly designed ground discs that are adapted to coact with opposite margins of the film, each margin being held in the groove of the disc by means of an endless belt. Another tenter is made up of two moving parallel chains which run in adjustable tracks and run in a horizontal plane. The width of the chains is governed by the distance between the adjustable tracks. The film is gripped by the chains and stretched in substantially right angles to the length or the direction of travel of the film. The tenter is contained in an enclosure which can be heated to any desired temperature. It is also often desirable to have a preheat zone in which the film is brought up to tentering temperature before the actual transverse stretching of the film begins. On the order of about half of the solvent originally present in the film as it entered the drafter is removed during the tentering operation. The tentering operation is usually carried out at temperatures in the range of from about 100° F. to about 260° F. and preferably from about 145 to 180° F. The ratio of stretching in the tentering operation is about the same as that described in the drafting operation or just a little less. In other words, it is preferred that the degree of stretching of the film in the longitudinal direction by drafting be about the same or a little greater than the degree of stretching in the lateral direction by tentering. The film is next heat set which comprises holding it so that it cannot retract either laterally or longitudinally and heating it at from about 125 to 250° C. for from a fraction of a second up to about five minutes. The length of time will depend to a large degree upon the temperature employed. For the higher heat setting temperatures, shorter periods of time are required. It is to be understood that the film after tentering can be relaxed somewhat before heat setting if it be so desired. Finally the film is cooled to about room temperature and rolled up or cut up in various lengths, etc. If the film is released from the tentering apparatus just after heat setting but before cooling, it will shrink to some extent during the cooling period and generally this is to be avoided. It is most desirable and most convenient to cool the film at least to below 120° C. after the heat setting treatment but before it is released from the tentering chains. Substantially all of the residual solvent is removed from the film during the heat setting operation so that the final cooled film will not contain any more than 10% and preferably no more than 5% by weight of residual solvent and more preferably the final film shall be substantially free of residual solvent.

Referring now to the accompanying drawing which is a flow-sheet setting forth in diagrammatic form the various steps of the process: A solution of the copolymer, formed by dissolving the dry polymer in an appropriate solvent, is passed through a filter and is then distributed in uniform thickness onto a moving stainless steel belt which passes through a drying oven which in this particular case was three heating zones and a cooling zone. The partially dried film is then removed from the stainless steel belt and is passed continuously to a differential roll speed drafter, where it is stretched in a longitudinal direction by passing between a pair of heated, slow moving rollers and then between a pair of unheated fast moving rollers. The film is then passed continuously into a tenter frame housed in a heated enclosed enter oven where it is stretched substantially at right angles to its length. While still on the tenter frame and near the exit from the oven the film is heat set and cooled, and is subsequently rolled up.

The oriented films embodied in the present invention are outstanding film barriers for various gases, water vapor and the like and in this respect they resemble metal foils more than they resemble other plastic films which are commercially available. The oriented films of this invention also have excellent resistance to attack by most chemicals, they have excellent dimensional stability, excellent resistance to degradation by ultraviolet radiation, they have good electrical properties and excellent mechanical strength including high tensile strength, high tensile modulus and excellent abrasion resistance. The foregoing and other desirable properties make the films of this invention particularly useful in a wide variety of applications such as magnetic tape, surfacing and laminating, packaging, electrical insulating tape, pressure sensitive tapes, glazing, and the like. The films of this invention can be laminated to plywood, wood, fiberglass panels, aluminum or other metals, paperboard or similar materials. Many of such laminated structures, as well as the film itself, are satisfactory for both indoor and outdoor use. The films and laminates may be metallized and end uses of a specific nature for laminates include chairs, bench tops, doors, radiant heating panels, thermal insulation, house siding and roofing, curtain wall panels, signs, vending machines, baseboard trim, cabinets, appliances, flooring, awnings, baby carriages, tarpaulins reflector signs, vehicle trim, dry battery covers, wall paper and fuel cells. Metallized film can be cut into fine strips and made into metallized yarn of varying colors. The films themselves can be cut into fibers and used to make yarns, felts and non-woven fabrics of various types. It should be stressed that the ultimate film properties can be tailored within certain limits through slight variation in the orienting and heat setting conditions. As a packaging or barrier film, this high stretch ratio (on the order of 8:1 total areal draw) biaxially oriented film is highly desirable. However, even at a total areal draw of 3:1 a very low water vapor transmission was obtained. For use in a laminated package such a film with a lower tensile strength is satisfactory and somewhat lower in cost. Unbalanced orientation film has been made for tape use. Some of this material has been coated with magnetic iron oxide dopes and the resulting product has shown promise as sound and computer recording tape. Similar applications include photographic and cinematographic film base, video tapes, packaging tapes, adhesive tapes, conveyor belts, electrical tapes, typewriter ribbons, tapes for capacitor winding and transformer winding and the like. A moderate amount of transverse orientation is desirable even in tape applications in order to avoid uniaxial splitting which often occurs in uniaxial oriented film.

In general, typical films prepared by the process of this invention will have the following properties.

| | |
|---|---|
| Area factor, in.²/mil/lb. | 24,000 |
| Tensile strength, p.s.i.: | |
| MD | 16–25,000 |
| TD | 16–25,000 |
| Elongation, percent: | |
| MD | 20–70 |
| TD | 20–70 |
| Tensile modulus, p.s.i.×10⁵ | 5.0–6 |
| Drop rod failure, height inches | 18–25 |
| Tear resistance, g./ml., Elmendorf (initiated) | 23–64 |
| Tensile heat distortion, p.s.i. at 250° C. | 50 |
| Resistance to heat, at 250° C. | Chars |
| Dimensional stability: | |
| 212° F., percent | −0.5 |
| 250° F., percent | −2.5 |
| Dielectric strength, volts/mil | 4,000 |
| Dielectric constant | 3 |
| Dissipation factor | 0.025 |
| Abrasion resistance, A.S.T.M. D968% gloss retention | 81 |
| Water absorption, 24 hours, 25° C., percent | 0.0 |
| Sunlight resistance, hours exposure to S-1 sunlamp without change | 624 |

Solvent and chemical resistance, A.S.T.M. D1239–55, percent weight increase.

| | |
|---|---|
| Distilled water | 0.00 |
| Soap solution (1%) | 0.00 |
| Cotton seed oil | 0.00 |
| Mineral oil | 0.00 |
| Kerosene | 0.00 |
| Ethyl alcohol (50%) | 0.00 |
| NH₄OH (10%) | 0.00 |
| HCl (10%) | 0.00 |
| NaOH (10%) | 0.00 |

In most uses for film the film thickness in the range of 0.5 to 1 or 1.5 mils is generally most desirable. In laminating applications, film thicknesses of 1, 1.5, 2 and even as high as 3 mils may be employed.

It is to be understood that those skilled in the art can make various modifications and changes in the compositions and processes described herein without departing from the scope of this invention.

In the following illustrative examples the amounts of ingredients are expressed in parts by weight unless otherwise indicated:

Example I

An acrylonitrile copolymer of the type more fully described in the copending U.S. patent application of R. E. Isley and R. C. Adams, Ser. No. 265,081, now U.S. Patent No. 3,253,058 was prepared from the following recipe:

| | Parts |
|---|---|
| (a) Water | 400 |
| (b) Emulsifier¹ | 3.5 |
| (c) Ammonium persulfate | 0.5 |
| (d) Potassium metabisulfite | 0.23 |
| (e) t-Dodecyl mercaptan | 0.7 |
| (f) Acrylonitrile | 1.76 |
| (g) Butanediol-1,4-divinyl ether | 0.34 |
| (h) Acrylonitrile | 97.9 |

¹ A mixture of

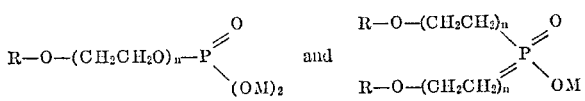

more fully described above and marketed by the General Aniline and Film Corp.

Ingredients (a)–(e) were charged into a reactor and the temperature was brought to 50° C. with stirring. A nitrogen atmosphere was maintained in the reaction vessel. Ingredients (f) and (g) were added and polymerization of these two monomers was substantially completed in about a 90 minute period. Then the ingredient (h) was added continuously over a 195 minute period while the reaction mixture was maintained at 50° C. and the resulting polymer dispersion was stirred and heated at 50° C. for an additional three hours. The final product was a suspension of polymer in water from which the polymer was readily isolated by filtration. The isolated polymer was washed on the filter and dried in an oven.

The dry polymer prepared as described above was dissolved to form a 17% solution by employing a high speed stirrer and a temperature of 60° C. The solvent employed was a 90/10 mixture of dimethyl formamide and ethylene carbonate. A ten gallon jacket and stirred pressure autoclave was employed. The solvent was added followed by the polymer with stirring. Agitation was vigorous enough to maintain a uniform suspension in the early stages of dissolving. The suspension was then heated at 55–65° C. and the polymer dissolved readily. This is a low viscosity type of solution preparation as opposed to polymer mastication and dilution in a kneading type of mixer. The resulting polymer solution was filtered by passing it through a screen pack filter built up from stainless steel screens. A 140 mesh stainless steel screen was used which was protected on either side of a 40 mesh screen.

The above solution or dope was cast using a doctor blade in the laboratory or a three roll reverse roll coater on a large scale (see Modern Plastics, September and October 1958, "Take Your Choice of Coating Methods," by G. L. Booth). A heated dope and a heated reverse roll coater were used at temperatures of about 160° F. The dope was cast onto a stainless steel endless belt and was dried in a three zone circulating air oven. The resulting film when removed from the belt contained 14.7% by weight of dimethyl formamide and 20.5% by weight of ethylene carbonate.

The film produced in the foregoing manner was then run through a drafter having two heated rolls and two cold rolls for longitudinal orientation. The heated rolls were maintained at about 160° F. and the cold rolls were maintained at about 60° F. The stretch ratio in the drafter was about 3:1 or 200% elongation of the film which was achieved by running the cold rolls faster than the hot ones. A typical calculated elongation rate on the drafter was about 90,000% per minute. The stretched film was found to contain 10.7% by weight of dimethyl formamide and 20.1% by weight of ethylene carbonate or 30.8% by weight of total solvent.

After longitudinal orientation the film was stretched laterally in a tenter frame. The stretch ratio in the lateral direction was 2.8:1 (180%). The oven stretch zone temperature of 160° F. was maintained. Maximum calculated rate of stretch in the lateral direction was about 1730% per minute. The solvent content of the film after stretching was 0.0% by weight dimethyl formamide and 16.3% by weight ethylene carbonate.

The biaxially oriented film from above was then run through a heat set zone in a tenter frame oven. The oven zone temperature was 400° F. and a time of 30 seconds at this temperature was employed. The final solvent analysis of the film indicated no dimethyl formamide and less than 1% by weight of ethylene carbonate present.

The film prepared in the foregoing manner was found to have the following properties.

Longitudinal tensile strength, p.s.i. _____ 20,900
Longitudinal elongation, percent _____ 65
Lateral tensile strength, p.s.i. _____ 20,000
Lateral elongation (ASTM D282), percent ____ 85
Tensile heat distortion (ASTM D1637-61) ____ 255° C.
Hydrogen transmission rate, cm.$^3$/100 in.$^2$/24 hr./atm., sample ½ mil thick (ASTM D1434-58) _____ 34.5
Water vapor transmission rate, g./100 in.$^2$/24 hr./ml. (ASTM E96, Procedure A, 73.4° F. and 50% relative humidity) _____ 0.11
Gas transmission, cc./100 in.$^2$/24 hr. atm./mil:
   Oxygen _____ 0.0016
   Carbon dioxide _____ 0.001
   Nitrogen _____ 0.001
   Methane _____ 0.0041
   Helium _____ 62.5
   Ammonia _____ 0.054
Density, g./cc. _____ 1.172

When the biaxially oriented, heat set film described above was folded 180° on itself in numerous places and pressed tightly when folded with much flexing and was then straightened out it was found that the resulting film retained the gas transmission properties given above. This is a most valuable property and is unlike the behavior observed in the case of the metal foils such as aluminum, tin and the like wherein cracking occurs readily and destroys the vapor barrier properties inherent in most metal foils.

In comparison, a number of commercial biaxially oriented films were tested for gas transmission using the above procedure with the following results:

| Film | Gas transmission | | |
|---|---|---|---|
| | Oxygen | CO$_2$ | N$_2$ |
| Polyethylene terephthalate | 3 | 16 | 1 |
| Polypropylene | 160 | 539 | 199 |
| Rigid polyvinyl chloride | 56.5 | 302 | ([1]) |
| Polyvinyl fluoride | 3.2 | 11.1 | 0.25 |

[1] Not tested.

In each of the commercial films described above the helium transmission was so great that it could not be measured.

A dried, unoriented film prepared from a diethyl carbonate-dimethyl formamide solution from an acrylonitrile-butanediol-1,4-divinyl ether copolymer was found to have a density of 1.169 g./cc.

Example II

A polymer was prepared according to the procedure of Example I except that (e) was 0.5 part of t-dodecyl mercaptan, (f) was 0.5 part of acrylonitrile, (g) was 0.5 part of tetramethylene diacrylate and (h) was 99 parts of acrylonitrile. The reaction temperature was 65° C., the first step reaction time was 30 minutes, the main step (acrylonitrile addition) was 100 minutes and the post addition reaction time was 45 minutes. The resulting polymer had a Gardner tube viscosity of 100 seconds at 15% by weight concentration in dimethyl formamide.

A casting dope of the dried polymer was prepared as in Example I. A 19% by weight solution of polymer was prepared in a 90/10 weight mixture of dimethyl formamide/ethylene carbonate mixed solvent.

A film was machine cast as in Example I and the cast film was found to contain about 40% by weight of solvent mixture.

The foregoing cast film was drafted as in Example I in a drafter employing a 3:1 stretch ratio and a calculated stretching rate of about 52,800% per minute. The drafter had hot rolls at 160° F. and cold rolls at 65° F. At the end of the drafting operation the film was found to contain 39% by weight of solvent composed of 18.7% dimethyl formamide and 20.3% ethylene carbonate.

The drafted film was then subjected to a tentering operation as in Example I. The stretch area temperature was maintained at 170° F. and a calculated stretch rate of about 1545%/min. was employed. A stretch rate of about 2.8:1 was employed in the tentering operation. The resulting film was found to contain 3.75% by weight of dimethyl formamide and 18.6% by weight of ethylene carbonate.

Finally, the film from above was held in a nonshrinkable position both longitudinally and laterally at a temperature of 155° C. for about one minute. The resulting biaxially oriented, heat set film was found to contain 1.01% by weight of dimethyl formamide and 7.1% by weight of ethylene carbonate. The biaxially oriented, heat set film was found to have the following physical properties:

Longitudinal tensile, p.s.i. _____ 18,800
Longitudinal elongation, percent _____ 52
Lateral tensile, p.s.i. _____ 17,000
Lateral elongation, percent _____ 47

A polymer prepared from acrylonitrile and triethylene dimethacrylate according to the procedure of Example I was cast into a film by the foregoing procedure. The dried, unoriented film was found to have an oxygen transmission of 0.2 cc. per 100 in.$^2$/24 hours/atmosphere in a 1.2 mil thickness.

Example III

The procedure of Example I was repeated using a polymer having a 116 sec. Gardner viscosity in dimethyl formamide (15%). The casting dope was a 17% by weight solution of polymer in a 90/10 mixture of dimethyl formamide/ethylene carbonate. The solvent contents at various points in the process were:

| Film | Solvent content, wt. percent | | |
|---|---|---|---|
| | Dimethyl formamide | Ethylene carbonate | Total |
| Cast, unoriented | 32.9 | 22.4 | 55.3 |
| Uniaxially oriented | 4.5 | 19.5 | 24.0 |
| Biaxially oriented | 2.9 | 19.5 | 22.4 |
| Head set, final film | 0 | 5.95 | 5.95 |

The final film had tensiles of 20,200 p.s.i. in the longitudinal direction and 18,600 p.s.i. in the lateral direction.

Example IV

A polymer was prepared according to the procedure of Example III. The cast, unoriented film was found to contain 9.9% by weight of dimethyl formamide and 19% by weight of ethylene carbonate. The cast film was oriented (after being pre-heated about 35 seconds at 190° F.) in the longitudinal direction by stretching 4 times. The solvent content of the uniaxially oriented film was found to be 5.2% by weight dimethyl formamide and 17% by weight of ethylene carbonate. The film was then oriented by stretching 3 times (after being preheated about 35 seconds at 190° F.) in the lateral direction and the biaxially oriented film was found to contain 3% by weight of dimethyl formamide and 16.5% by weight of ethylene carbonate. The biaxially oriented film was then heat set (1 minute at 195° C.) and the final film was found to contain 0.4% by weight of dimethyl formamide and 5.8% by weight of ethylene carbonate and to have tensile strengths of 24,000 p.s.i. in the longitudinal direction and 18,000 p.s.i. in the transverse direction.

Example V

A polymer was prepared according to the procedure of Example I. A casting dope was prepared and a film was cast according to the procedure of Example I. The cast film was found to contain 23% by weight of dimethyl formamide and 17.7% by weight of ethylene carbonate. Various samples of this cast film were oriented in the laboratory by stretching longitudinally (after being pre-heated 20 seconds at 210° F.) and laterally (after being pre-heated 10 seconds at 210° F.) and each biaxially oriented film was heat set under longitudinal and lateral tension for 10 minutes at 210° F. This film was further heat set in a second step for 1 minute at 195° C. The effect of various stretch ratios and areal draws on the physical properties of these films are given in the table below:

| Stretching ratio | | | Tensile, p.s.i. | | Elongation, percent | |
|---|---|---|---|---|---|---|
| Long. | Lat. | Total areal | Long. | Lat. | Long. | Lat. |
| Unoriented, control | | | 8,000 | 8,000 | 5 | 5 |
| 2.6 | 2.4 | 6.25 | 16,500 | 22,600 | 75 | 45 |
| 2.6 | 2.6 | 6.75 | 13,250 | 22,500 | 31 | 41 |
| 2.75 | 2.75 | 7.65 | 20,250 | 25,500 | 38 | 24 |
| 2.75 | 2.8 | 7.8 | 17,500 | 19,900 | 28 | 14 |
| 3 | 2.8 | 8.0 | 24,850 | 28,400 | 60 | 56 |
| 3 | 3 | 9.0 | 17,500 | 18,900 | 49 | 26 |
| 3.1 | 3.1 | 9.2 | 17,900 | 19,500 | 14 | 36 |
| 3 | 3.5 | 10.5 | 18,200 | 22,300 | 25 | 24 |
| 3 | 4 | 12.0 | 19,550 | 23,400 | 10 | 12 |
| 3.05 | 4 | 14.0 | 20,200 | 27,200 | 60 | 35 |
| 4 | 4 | 16.0 | 17,000 | 24,300 | 20 | 21 |

Similar results were obtained when dimethyl formamide alone or mixtures of dimethyl formamide and dimethyl sulfoxide were used as solvents.

Example VI

When the procedure of Example II was repeated using methacrylonitrile in place of acrylonitrile and nitroethane was used as the polymer solvent instead of the dimethyl formamide/ethylene carbonate mixture, a diaxially oriented film (2.75 stretch ratio in both the longitudinal and lateral directions) was found to have the following physical properties.

Longitudinal direction:
    Tensile _____ p.s.i__ 8,130
    Elongation _____ percent__ 7.3
Lateral direction:
    Tensile _____ p.s.i__ 10,300
    Elongation _____ percent__ 26

Similar results were obtained when the acrylonitrile of Example II was replaced partly with methacrylonitrile.

Example VII

When Example I was repeated with the exception of the heat setting step, a film resulted which had an oxygen transmission of greater than 1 cc./100 in.$^2$/24 hr./atm./mil.

Example VIII

A copolymer of acrylonitrile and divinyl benzene was prepared in a single step (batch) polymerization using the following ingredients in the batch charge:

Parts
Distilled water _____ 400
Acrylonitrile _____ 100
Divinyl benzene _____ 0.38
t-Dodecyl mercaptan _____ 0.6
Gafac RE–610 emulsifier _____ 3.5
Ammonium persulfate _____ 0.5
Sodium meta-bisulfite _____ 0.23

The first five ingredients were charged to the reactor which was then purged with nitrogen and brought to 50° C. under agitation. The polymerization was accomplished by addition of the last two ingredients (initiator-ammonium persulfate and sodium meta-bisulfite). The polymerization reaction was conducted for about six hours. The resulting polymer was isolated by filtration and was washed thoroughly to remove emulsifier and initiator and was then air dried at 70° C. for 36 hours. The yield of polymer was 96% of theory.

A 14% solids solution of the foregoing polymer was prepared in a 95:5 mixture of dimethyl formamide: ethylene carbonate and a film was cast on glass plates from the solution by means of a 50 mil casting blade. The films were then "set" for an hour in an air oven at 65° C.

The solvent-swollen films from above were removed from the glass and were oriented biaxially in a two-step laboratory orientation apparatus. Orientation in the primary direction was accomplished by heating the film for 30 seconds with a 1500 watt radiant heater and then quickly drawing the film to three times its original length. Subsequent secondary drawing in a direction at right angles to the primary direction was accomplished in the same manner.

The biaxially oriented film was then heat set in a retaining frame which retained the dimensions of the film at a temperature of from 195–200° C. for from 1 to 2 minutes. Films thus prepared having the various longitudinal and transverse draw ratios were found to have the physical properties given in the table below:

| Draw Ratio | | Tensile Strength ×10$^{-3}$ p.s.i. | | Percent elongation | |
|---|---|---|---|---|---|
| Long. | Lat. | Long. | Lat. | Long. | Lat. |
| 3 | 3 | 22.6 | 18.4 | 71 | 83 |
| 2.6 | 2.5 | 13.8 | 14.2 | 66.5 | 66.1 |
| 3 | 2.5 | 13 | 15.3 | 16.2 | 42.7 |
| 3.2 | 2 | 16 | 13.5 | 42.7 | 57.6 |

We claim:
1. The process for preparing a biaxially oriented polymer film comprising forming a solution of a copolymer prepared by
    (A) copolymerizing in the presence of from 0.05 to 10% by weight based on the total weight of monomers employed of a free radical polymerization cata- lyst from 5 to 0.05 part by weight of at least one polyalkenyl monomer having at least two $CH_2{=}C{<}$ groups per molecule separated by at least one other group, with no more than 50 parts by weight of at least one alpha, beta-monoolefinically unsaturated nitrile monomer having from 3 to 4 carbon atoms and a terminal $CH_2{=}C{<}$ group until substantially all of the monomers are converted to polymer and then (B) polymerizing at least 50 parts by weight of additional nitrile monomer onto (A) until a final conversion of from 70 to 100% of monomers to polymer is reached in a volatile polar organic solvent, (1) forming a film containing from 8 to 60% by weight of solvent from said solution, (2) stretching the resulting film at a temperature of from 100 to 260° F. in a longitudinal and transverse direction so that the film then contains about one-half the weight of polar solvent that it contained after (2), and then (3) drying the film at a temperature of from about 125 to 250° C. for up to about five minutes while it is retained in its biaxially stretched condition.

2. The process of claim 1 wherein the alpha, beta-olefinically unsaturated nitrile monomer is acrylonitrile.

3. The process of claim 1 wherein the alpha, beta-olefinically unsaturated nitrile monomer is methacrylonitrile.

4. The process of claim 1 wherein the alpha, beta-olefinically unsaturated nitrile component is a mixture of acrylonitrile and methacrylonitrile.

5. The process of claim 2 wherein the formed film contains from 25 to 45% by weight of the polar solvent.

6. The biaxially oriented acrylonitrile polymer film resulting from the process of claim 1.

7. The process of claim 5 wherein the polyalkenyl monomer is tetramethylene diacrylate.

References Cited

UNITED STATES PATENTS

| | | | |
|---|---|---|---|
| 3,253,058 | 5/1966 | Isley et al. | 260—881 |
| 3,268,490 | 8/1966 | Sunden et al. | 264—182 |
| 3,275,612 | 8/1966 | Bechtold | 260—88.7 |

FOREIGN PATENTS 887,008   1/1962   Great Britain.

JULIUS FROME, *Primary Examiner.*

A. KOECKERT, *Assistant Examiner.*

U.S. Cl. X.R.

264—206, 210, 289, 345